April 2, 1935.  W. A. LOTH  1,996,161
REGULATION OF FURNACES
Filed Jan. 23, 1933
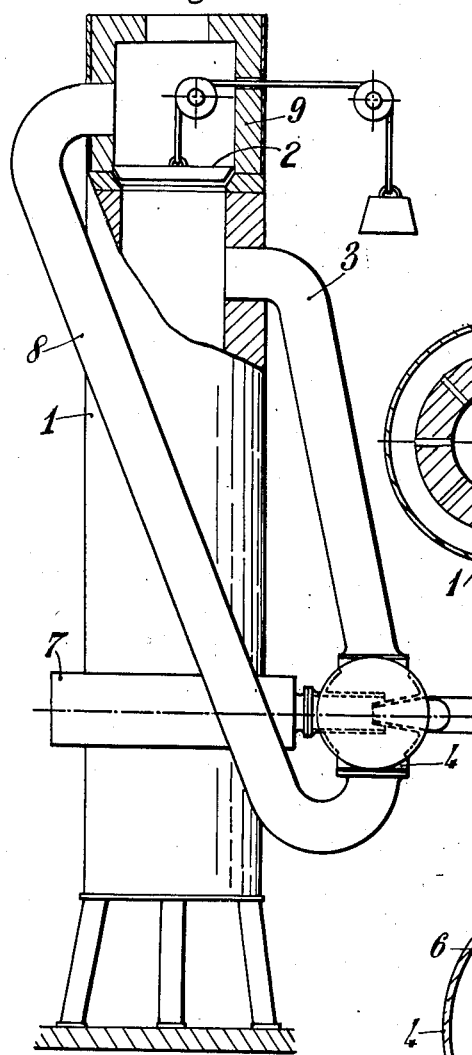
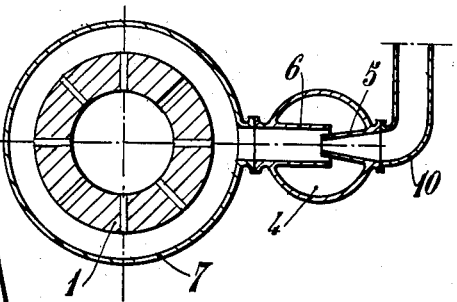
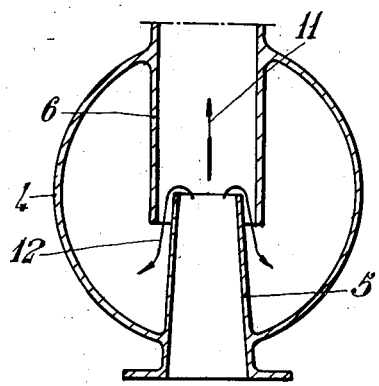
W. A. Loth
INVENTOR
By Marks & Clerk
ATTYS.

Patented Apr. 2, 1935

1,996,161

UNITED STATES PATENT OFFICE 1,996,161

REGULATION OF FURNACES

William Arthur Loth, Paris, France, assignor to Société à Responsabilité Limitée: L. F. T. Fonderies, La Courneuve, France Application January 23, 1933, Serial No. 653,152
In France July 5, 1932

1 Claim. (Cl. 266—30)

The present invention has for its object an automatic or semi-automatic regulating device for the management of furnaces and hearths of any nature, fed with solid, liquid or gaseous fuels.

The device according to the invention is adapted to permanently ensure the admission in the furnace, hearth or the like of the quantity of air necessary for obtaining the highest temperature possible.

In fact, for obtaining a high temperature, it is necessary to produce an important evolution of calories in the minimum of time. For obtaining this maximum evolution of calories, it is obviously necessary, in order to provide suitable efficiency, to ensure a complete combustion. The quantity of air corresponding to this complete combustion must therefore be admitted in the furnace. But, on the other hand, too much air must not be admitted in the furnace, because a portion only of this air would serve to determine combustion, the other portion having no action in that respect and absorbing, by its unprofitable passage in the furnace, a portion of the calories produced.

Consequently, for the working of a furnace in which it is desired to obtain a high temperature, it is necessary to constantly exert the utmost care in the admission of air in the furnace. The quantity of air introduced must remain included between two very narrow limits, as, if these limits are departed from, either by excess or by deficiency, the temperature of the furnace lowers.

Moreover, in the case of furnaces used for the treatment of metals, such as refining or smelting furnaces, or cupola furnaces, or blast-furnaces, the admission of an excess of air has other inconveniences, owing to the fact that this excess of air oxidizes the metals treated.

The device according to the invention ensures an automatic regulation, either total, or partial, of the quantity of air injected in the furnace. According to the invention, this regulation is obtained by supplying air to the furnace by means of a device similar to an injector (that is to say through a nozzle entering an open pipe arranged according to the same axis), this injector being arranged in an enclosure connected, on the one hand, to the upper part of the furnace, and, on the other hand, to the stack, in such a manner that the gases coming from the furnace pass (in totality or partially) through this enclosure.

A functional feature of this arrangement consists in that a portion only of the air supplied by the injector enters the furnace, the other portion escaping through the annular inlet provided between the nozzle and the pipe directly surrounding it in the gas exhaust pipe line. But the ratio between these two quantities of air (that entering the furnace and that directly escaping therefrom) is not constant. When the combustion tends to slow down, the quantity of air admitted in the furnace increases, and, on the contrary, when the combustion has reached its maximum efficiency, the quantity of air introduced in the furnace diminishes. A real automatic regulation therefore takes place and the mechanism of the same can be explained as follows:

When the combustion diminishes in intensity, the quantity of gases produced also diminishes. Consequently, the static pressure within the furnace also diminishes. Owing to this fact, the air is injected more easily in the furnace and the fraction of the total quantity of air entering the furnace increases. On the contrary, when the combustion accelerates, the quantity of gases evolved is greater, the pressure in the furnace increases, and, consequently, the injection of air in the said furnace takes place with greater difficulty and diminishes, the fraction of air escaping through the stack then increasing.

It will thus be seen that the system allows to regulate the admission of air in the furnace by very simple means, in function of the pressure existing in the furnace. Experience has formally shown that the result previously indicated was really obtained. This experiment has been effected with a cupola furnace (a so-called "second smelting furnace"), in which has been obtained, without special precautions, a working in the best conditions of efficiency and with the highest temperature possible.

The accompanying drawing illustrates, by way of example only, a form of carrying the invention into practice.

Fig. 1 is an elevation.

Fig. 2 is a sectional plan view made according to line II—II of Fig. 1.

Fig. 3 is a similar view on an enlarged scale.

This example relates to a cupola or second smelting furnace.

The cupola furnace is indicated at 1; this cupola is provided, at its upper part, with a closure 2, of any type, allowing, during normal working to completely obturate the throat of the cupola furnace or to partially obturate it, and which also allows the pushing in of the charges in the usual manner.

During the operation, the gas produced by the reactions taking place in the blast furnace, is evacuated through a pipe line 3 leading to the device indicated at 4 and which constitutes the important part of the invention by its new application to apparatus of the type indicated.

The device 4 is constituted by an injector composed of a convergent tube 5 opening in a nozzle 6, of suitable shape, connected to the blast chamber 7 of the cupola furnace. The injector 5 and nozzle 6 are surrounded by the enclosure 4 to which the pipe 3 leads. This enclosure 4 is, moreover, connected by another pipe 8 to the stack 9.

The air blown by a fan or any other apparatus, is admitted through a conduit 10 connected to the convergent tube 5.

The quantity of air admitted in the blast chamber 7 is variable. In fact, the air injected through the convergent tube 5 can follow two different paths: one towards the chamber 7, according to the arrow 11, and the other towards the enclosure 4, according to the arrow 12 (Fig. 3).

The ratio between the quantity of air following the path 11 and that following the path 12 depends on the static pressure existing within the furnace. If this pressure is low, the air passes nearly in totality or in totality through the path 11 owing to its kinetic energy. If, on the contrary, the pressure in the cupola furnace is higher, a more and more important portion of the air will follow the path 12.

Now, the pressure in the cupola furnace increases so much the more as the combustion is more active. Consequently, to a very active combustion corresponds a diminution of the quantity of air injected, whereas to a diminution of activity of the combustion corresponds an increase of the quantity of air injected.

Consequently, it will be seen that an automatic regulation, which can be partial or total, takes place, since when the activity of the combustion tends to diminish, the quantity of air injected increases, this having for effect to again accelerate the combustion, whereas for a combustion reaching the maximum activity, the quantity of air injected diminishes so as not to create an excess of air.

For instance, it is very easy, by charging an apparatus with 100% of steel scrap to which will of course be previously added silicon and manganese, to obtain a final product which is no other than a synthetic pig iron having very high mechanical characteristics; by substituting wood for coke, a much more valuable product is obtained in which scarcely a trace of sulphur is to be found.

This process is applicable to all smelting, refining or like apparatus, in which it is necessary to mix with any fuel a combustion supporting agent in excess and in which the latter might cause perturbations owing to the excess sent in the apparatus.

What I claim as my invention and desire to secure by Letters Patent is:

In combination: a furnace comprising, at its base, air supply means and at the upper part, charging means capable of being obturated, an injector, composed of a pipe, of a nozzle entering this pipe, and of an enclosure surrounding the nozzle and the pipe; a conduit for connecting the pipe to the air supply means at the base of the furnace; a conduit for connecting the enclosure to the upper part of the furnace to lead the combustion gases from the furnace to said enclosure; a stack; a conduit for connecting the enclosure to the said stack; air compressing means and a conduit for connecting the nozzle to the said air-compressing means.

WILLIAM ARTHUR LOTH.